(12) United States Patent
Aronstam

(10) Patent No.: US 6,894,949 B2
(45) Date of Patent: May 17, 2005

(54) WALKAWAY TOMOGRAPHIC MONITORING

(75) Inventor: Peter Aronstam, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 280 days.

(21) Appl. No.: 10/264,565

(22) Filed: Oct. 4, 2002

(65) Prior Publication Data

US 2004/0068376 A1 Apr. 8, 2004

(51) Int. Cl.⁷ .................................................. G01V 1/00
(52) U.S. Cl. ........................ 367/57; 367/38; 367/56
(58) Field of Search .................................. 367/37, 57

(56) References Cited

U.S. PATENT DOCUMENTS

| | | | | |
|---|---|---|---|---|
| 4,943,950 A | * | 7/1990 | Beasley et al. ............... 367/50 |
| 4,969,130 A | * | 11/1990 | Wason et al. ................. 367/73 |
| 5,481,501 A | * | 1/1996 | Blakeslee et al. ............. 367/57 |
| 5,740,125 A | | 4/1998 | Chon et al. ................... 367/75 |
| 5,742,560 A | * | 4/1998 | Krebs ........................... 367/57 |
| 6,009,043 A | | 12/1999 | Chon et al. ................... 367/75 |
| 6,076,045 A | | 6/2000 | Naville ......................... 702/10 |
| 6,147,929 A | | 11/2000 | Parra ........................... 367/69 |
| 6,169,959 B1 | * | 1/2001 | Dragoset, Jr. ................ 702/17 |
| 6,289,284 B1 | * | 9/2001 | Yamamoto .................... 702/14 |
| 6,324,478 B1 | * | 11/2001 | Popovici et al. .............. 702/18 |
| 6,388,947 B1 | * | 5/2002 | Washbourne et al. ......... 367/73 |

* cited by examiner

Primary Examiner—Thomas H. Tarcza
Assistant Examiner—Scott A. Hughes
(74) Attorney, Agent, or Firm—Madan, Mossman & Sriram, P.C.

(57) ABSTRACT

Surface seismic sources are used to simulate crosswell data between the two wells, and, using surface receivers, reflection seismic data are obtained over the region between the two wells. Reflection data are preferably obtained from reflectors both above and below the reservoir. Tomographic analysis of the simulated crosswell and reflection data gives a model of the reservoir. Changes in the model are indicative of reservoir fluid changes, pressure changes, or compaction.

15 Claims, 3 Drawing Sheets

WALKAWAY TOMOGRAPHIC MONITORING

BACKGROUND OF THE INVENTION

1. Field of the Invention

The invention is related generally to the field of interpretation of reservoir monitoring using time-lapse seismic measurements. More specifically, the present invention is directed towards a novel configuration of sources and receivers for providing improved tomographic reconstruction of reservoir images.

2. Background of the Art

Geophysical surveys are used to discover the extent of subsurface mineral deposits such as oil, natural gas, water, sulphur, etc. Geophysical methods may also be used to monitor changes in the deposit, such as depletion resulting from production of the mineral over the natural lifetime of the deposit which may be many years. The usefulness of a geophysical study depends on the ability to quantitatively measure and evaluate some geophysical analogue of a petrophysical parameter that is directly related to the presence of the mineral under consideration.

Conventional crosswell seismic imaging typically utilizes a pair of boreholes in proximity to a reservoir of interest. In the first of these boreholes, a seismic source is deployed for emitting seismic energy into the region of interest. For reasons discussed below, swept frequency sources are commonly used. The source is sequentially moved through a series of positions within the first borehole and a seismic signal is generated at each position. The seismic energy passes through the subterranean formation of interest to the second one of the pair of boreholes. A receiver array is typically deployed within the second borehole and, like the seismic source, the receiver array is moved through a series of positions within the second borehole. By transmitting a signal from each source position in the first borehole and receiving data from each source position at each receiver position in the second borehole, a seismic crosswell data set is generated.

Referring to FIG. 1, crosswell imaging is typically performed using a crosswell imaging system which is generally indicated by the reference numeral 10. In system 10, seismic energy 12 is transmitted through a subsurface region 14 of the ground using a source 16 which is positioned in a first borehole 18. A movable seismic source moved to locations $S_1 \ldots S_n$ is used to generate seismic waves denoted by 12 that propagate from the first borehole 18. The seismic waves are detected in the second borehole 24 by suitable detectors. Commonly, a receiver array 22 comprising receivers 23a, 23b . . . 23e. is used for the purpose. The receiver array may be moved to positions denoted by R1 . . . Rs. Exemplary raypaths 28a . . . 28e and 30a . . . 30e show the raypaths for the seismic waves propagating from various source locations to the different receivers. The objective of seismic tomography is to measure the travel times for a plurality of source-receiver combinations and from the known geometry of the source and receiver locations, determine the velocity field for the propagating waves in the region 10. Methods for inverting the measured travel times to obtain the velocity field are known in the art.

In reservoir monitoring, the region 10 includes a reservoir from which hydrocarbons are recovered. In natural recovery of hydrocarbons as well as in secondary recovery wherein a fluid is injected from an injection well into the reservoir, there is a continuing replacement of one fluid by another in the reservoir. In addition, there may also be changes in the pressure of the fluids in the reservoir. Fluid substitution as well as pressure changes are known to cause changes in seismic velocities. Hence by monitoring changes in the velocity field, some inference can be made about changes in the fluid distribution in the reservoir and/or pressure changes therein. This process is called time-lapse tomography.

Typically, downhole seismic sources are swept frequency sources. The reason why swept frequency sources are used is that they are low power sources that are less likely to cause damage to boreholes than impulsive, high-power sources. A number of other low power seismic sources have been developed to enable the acquisition of crosswell seismic data. These include resonators, piezoelectric transducers, and magnetostrictive transducers. Other sources such as explosive or implosive sources, downhole airguns, and sparkers generally have higher power output and are more likely to cause damage to the wellbore. This low-power limitation restricts utilization of crosswell seismic tomography to situations in which the interwell distance is relatively short (i.e., no more than about 1,000 feet).

Another limitation on the use of crosswell seismic tomography is the substantial costs associated with preparing the wells for deployment of downhole seismic sources and receivers. In most cases, the diameters of the downhole seismic sources and receivers are too large to fit into the production tubing used to convey fluids from the reservoir to the surface. Therefore, at most sites, the production tubing must first be removed from the wells in order to conduct a crosswell survey and then be reinstalled following completion of the survey. Associated with the removal of production tubing is the cost of shutting down production for the seismic study.

Blakeslee (U.S. Pat. No. 5,481,501), the contents of which are fully incorporated herein by reference, discloses a method in which no sources are used in the wellbore. The method taught by Blakeslee is illustrated in FIG. 2 which shows two wells, well A and well B, extending downwardly into the earth 110. A seismic source s is located on the surface 112 of the earth 110, substantially in line with, but not between, wells A and B. A plurality of downhole seismic receivers, $a_1 \ldots a_n$. Preferably, a plurality of downhole seismic receivers, $b_1 \ldots b_n$. In order to simulate crosswell data between well A and B, the seismic source s is activated to generate a seismic signal which propagates through the subsurface formations and is recorded by each of the first well seismic receivers $a_1 \ldots a_n$. and each of the second well seismic receivers $b_1 \ldots b_n$. The resulting seismic data are then processed to yield information regarding the interwell region between wells A and B.

The method used by Blakeslee uses Fermat's principle to a ray traveling from the source s to a receiver such as $b_k$ in FIG. 2. If the velocity field between the wells A and B is known, then the travel time from each of the positions $a_1 \ldots a_n$; to the receiver $b_k$ can be calculated. From Fermat's principle, the measured traveltime from s to $b_k$, denoted by $T_{s,bk}$ is then given as $$T_{s,b_k} = Min_j(T_{s,a_j} + T_{a_j,b_k}) \tag{1}$$

A similar reasoning applies to the case shown in FIG. 3 where the well B lies between the well A and the source s. For FIG. 3, the traveltime $T_{s,ak}$ from the source s to a receiver $a_k$ is given as $$T_{s,a_k} = Min_j(T_{s,b_j} + T_{b_j,a_k}) \tag{2}$$

The method of Blakeslee assumes a velocity field, checks to see if eqs.(1)–(2) are satisfied for all receiver positions, and if they are not satisfied, iteratively alters the velocity field until the equation is approximately satisfied within some error bounds.

By using the method of Blakeslee, there is no necessity for using downhole sources. Consequently, it is possible to use conventional surface seismic sources for obtaining data that can be used for tomographic reconstruction of a subsurface region.

One of the problems with crosswell tomography (real or simulated) is that the ray paths cover only a limited range of angles and there is a serious lack of near vertical raypaths. The effect of the limited aperture is that the tomographic reconstruction may have low vertical resolution. There is a need for a method of obtaining data for tomographic analysis that does not need downhole sources while, at the same time, not suffering from poor vertical resolution. The present invention satisfies this need.

SUMMARY OF THE INVENTION

The present invention is a method of monitoring a reservoir in earth formations using seismic receivers in at least two wells. Surface seismic sources are used to simulate crosswell data between the two wells, and, using surface receivers, reflection seismic data are obtained over the region between the two wells. Reflection data are preferably obtained from reflectors both above and below the reservoir. Tomographic analysis of the simulated crosswell and reflection data gives a model of the reservoir. The data recorded in the wells may be used for correction the reflection data. This process is repeated at a later epoch after a period of production from the reservoir. Changes in the model are indicative of reservoir fluid changes, pressure changes, or compaction.

The simulation of crosswell data is done using Fermat's principle. In an optional embodiment of the invention, attenuation of the seismic signals is used for monitoring the reservoir.

DETAILED DESCRIPTION OF THE INVENTION

Figure 1:
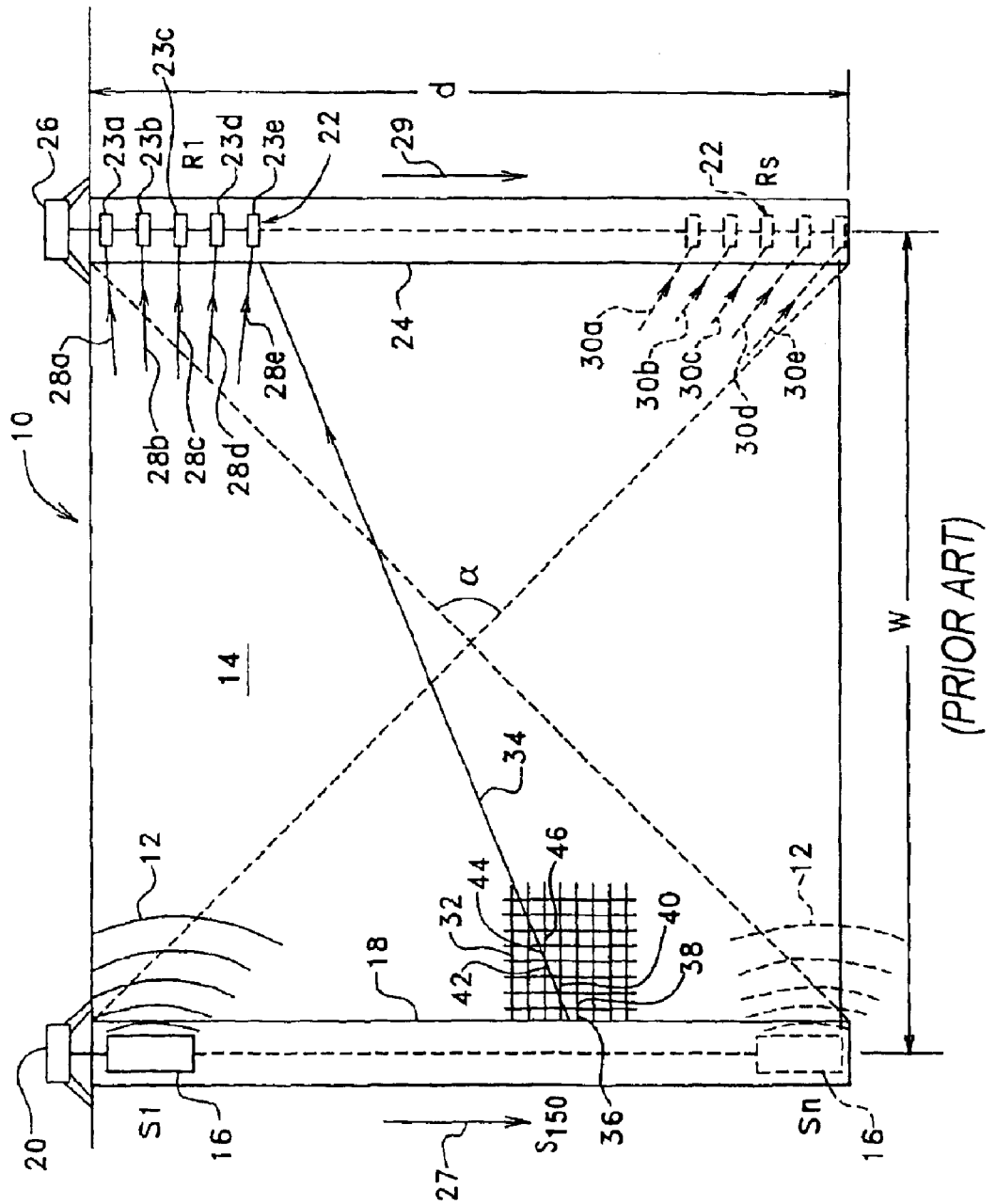
FIG. 1 (prior art) is a cross-sectional view in elevation of a subterranean region extending between two boreholes and illustrating a prior art method of generating a seismic velocity image.
Figure 2:
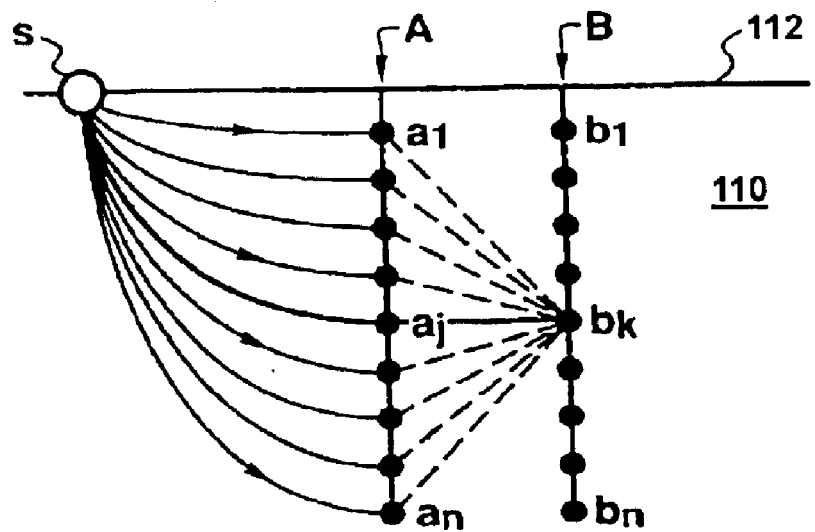
FIGS. 2 and 3 (prior art) schematically illustrate the present invention for simulating crosswell seismic data between wells A and B, with the seismic source s being closer to well A in FIG. 1 and closer to well B in FIG. 2.
Figure 3:
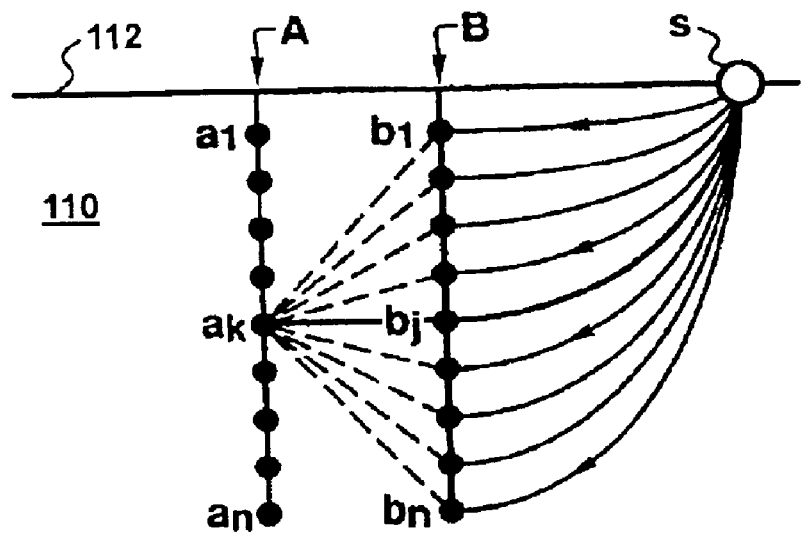
Figure 4:
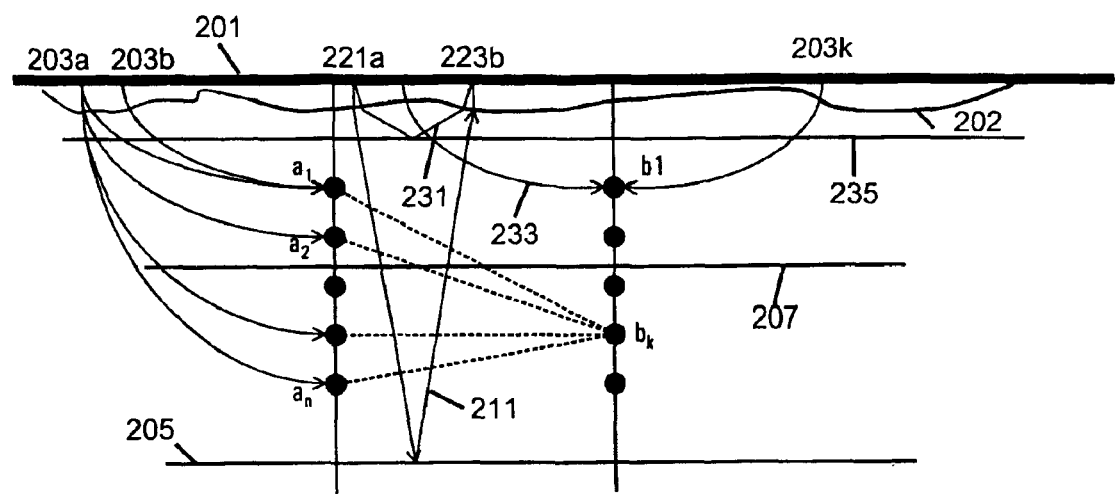
FIG. 4 illustrates the acquisition geometry for time-lapse tomography of the present invention.

The method of acquiring data for reservoir monitoring according to the present invention is schematically illustrated in FIG. 4. The data acquisition comprises three main features. As in Blakeslee, receivers $a_1 \ldots a_n$ and $b_1 \ldots b_n$ are deployed in two wells. Only two wells are shown to simplify the illustration and in reality, more wells could be used. Using surface seismic sources, depicted by $203a$, $203b \ldots 203k$, crosswell seismic data are simulated using the method described in Blakeslee. However, contrary to the teachings of Blakeslee, surface sources are also deployed between the two wells. This provides additional rays for tomographic reconstruction for the region between the two wells and addresses the problem of limited aperture with conventional or simulated crosswell tomography. An exemplary raypath for such a source between the two well locations is depicted by 233. Again, for simplifying the figure, only one raypath is shown from a single source to a single downhole detector: in reality, signals from a plurality of surface sources between the two wells would be recorded at a plurality of detectors in both the wells.

A third feature of the data acquisition in the present invention is the use of reflection tomography using sources such as $221a$ and receivers such as $223b$. For simplifying the illustration, only one source and one receiver are shown for the reflection tomography: in reality, there would be several sources and several receivers. Reflection data from a reflector such as 235, 207 and 205 are acquired. For simplifying the illustration, only three reflectors are shown. In reality, there would be several additional reflectors (not shown). A exemplary raypaths 211 and 231 from the source $221a$ that reflect from 205 and 231 respectively back to the receiver $223b$ are shown. For the purposes of this invention, it is necessary to have at least one reflector such as 235 that is above the producing reservoir. In addition, it is necessary to have a reflector 205 that is below the producing reservoir. Additional reflectors such as 207 within the producing reservoir are desirable. Reasons for having reflectors 235, 205 bracketing the producing reservoir are discussed later. These measurements are carried out at discrete periods over an extended period of time, referred to hereafter as epochs. The objective in reservoir monitoring is to use measurements made at different epochs to infer something about the change in the distribution of fluids in a reservoir. To accomplish this, it is common to do a tomographic inversion of data measured at each of the epochs and to compare the results of the tomographic inversions from one epoch to another.

In principle, one might think that using near vertical traveltime measurements to subsurface reflectors, the limited aperture discussed above with respect to crosswell tomography could be expanded, leading to an improved tomographic reconstruction. However, this has not been done for reasons discussed next.

Use of reflection tomography has been discussed in numerous publications. Bishop et al treat reflection seismic tomography as an iterative Gauss-Newton algorithm that produces a velocity depth model which minimizes the difference between traveltimes generated by tracing rays through the model and traveltimes measured from the data. However, as pointed out by Krebs (U.S. Pat. No. 6,002,642), "Unfortunately, surface seismic data do not contain enough information to uniquely specify both a migration velocity model and the reflector geometries. As a result, the derived velocity model may be ambiguous or geologically unreasonable. Improvements can be made by applying constraints to the optimization process, but those constraints generally reduce or eliminate the ambiguities at the expense of poorer fits to the traveltime data."

A second problem with reflection tomography is pointed out in Squires et al. This is discussed in the present invention by going back to FIG. 4 which shows a near surface weathering layer 202. Such a weathering layer occurs almost everywhere in the near surface on land due to weathering. This weathering layer is characterized by an irregular thickness an extremely low velocity. By way of reference, normal sedimentary rocks have compressional wave velocities that range from about 1.5 km/s upwards to 6 km/s. In contrast, the weathered layer can have velocities as low as 100 m/s.

As a result of this extremely low velocity, the ray-paths in the weathered layer are near vertical, as indicated in FIG. 4. The effect of the irregular thickness of the weathered layer is to introduce a delay into reflection raypaths that depend only on the location of the source (or receiver) and not on the source-receiver distance. For the lack of offset dependence, this delay is called a "static" delay. The effect of statics on tomographic analysis is discussed next.

Squires et al analyzed data from crosshole, Vertical Seismic Profile (VSP) and reverse VSP (RVSP) experiments and concluded that the tomographic reconstruction from such a combination of data exhibits a large lateral velocity contrast that is not supported by the surface reflection data at the same location. VSP data are acquired using a seismic source at or near the surface and a plurality of downhole detector positions whereas in RVSP, the data from a downhole source is recorded at a surface location. Squires et al concluded that the statics introduced errors not only in the region sampled by the RVSP but also contaminate other regions of the tomogram as well. Their results indicate that traveltime errors of the order of 2% can result in tomographic velocity errors of up to 7%. In the results of Squires, the VSP data did not show such a large effect as buried sources near the surface were used: presumably, a large effect would exist with a surface seismic source.

Jenkins et al report on an extensive time-lapse monitoring study carried out over a period of 31 months in Indonesia. Jenkins used hydrophones planted below the weathering but noted that the hydrophones could not be left in the ground for more than a few days because of mud accumulation on the case; consequently, they used steel lined shot and hydrophone holes. The effects of steam flooding on a shallow field (depth ~200 m) can be seen on reflection times from intervals the reservoir while reflections from above the reservoir show no changes in the time-laps monitoring.

What has not been recognized in prior art is that in differential tomography, the errors due to the factors discussed above cancel out. The use of reflection tomography in combination with simulated crosswell tomography in the present invention is based on a recognition that the problems discussed above (uncertainty of the inversion and the effect of statics) is greatly reduced in differential time-lapse tomography. What is of interest in reservoir monitoring is not the actual tomographic model, but differential changes in the subsurface as fluid substitution (and possible pressure changes) take place. If the near surface layer does not change during the course of the monitoring, then the effect of statics will cancel out and show up as a difference in traveltimes through the reservoir. However, if the near surface layer does change during the course of the monitoring, then the method of the present invention is able to correct for these changes as discussed next.

Dragoset (U.S. Pat. No, 5,946,271), the contents of which are fully incorporated herein by reference, teaches a calibration system for use in time lapse tomography. As taught in Dragoset, a discrete, minimally-equipped standard seismic calibration system is permanently installed over a subsurface reservoir structure that contains fluids of economic interest. Changes in the fluid content as a function of long-term time lapse may introduce changes in the acoustical characteristics of the reservoir rock layers, producing a corresponding change in the seismic signature recorded by the calibration system. The difference between two signatures over a selected time epoch defines a time-lapse calibration signature. The time lapse calibration signature can be applied to reduce the results of different conventional seismic data-acquisition systems of different vintages and technologies to a common standard.

With the method of the present invention, no special calibration sensor as taught by Dragoset is needed: instead, waveform changes, and any changes in the static delay over time, can be measured directly by the permanently implanted downhole sensors $a_1 \ldots a_n$ and $b_1 \ldots b_k$. Using the signals measured at these downhole sensors, changes in the static delay and in the source waveform for each of the surface sources 203a, 203b, . . . 203k can be monitored and used for correcting the surface reflection data. This makes it possible to obtain information about the reservoir over a wide range of angles and improve the quality of the tomographic reconstruction. The source corrections can be applied to the reflection seismic data to improve the resolution of reflectors such as 235, 205 that bracket the reservoir. Differences in traveltime for reflections for such reflectors is then indicative of changes in the reservoir interval therebetween.

Another aspect of the present invention that is particularly relevant in the presence of a weathered zone is the optional use of seismic attenuation tomography. Conventional tomography relies on the picking of traveltimes for energy propagation from a plurality of sources to a plurality of receivers. Additional information about the medium is also contained in the frequency spectrum of the signal. Quan et al discuss the use of seismic attenuation tomography. In most natural materials, seismic attenuation increases with frequency. The high frequency components of the seismic signal are attenuated more rapidly that the low frequency components as waves propagate. As a result, the centroid of the signal's spectrum experiences a downshift during propagation. Under the assumption of a frequency independent quality factor (Q), this downshift is proportional to a path integral through the attenuation distribution and can be used as observed data to reconstruct the attenuation distribution tomographically. The attenuation is related to the fluid distribution in a producing reservoir and thus provides another parameter that can provide reservoir information. The present invention optionally uses attenuation tomography to provide further insight into the flow of fluids in the reservoir.

The method of the present invention is equally applicable for land and marine applications. For marine applications, the seismic sources are usually airguns deployed from a survey vessel and the receivers may be carried on seismic streamer cables or may be located on the ocean bottom.

Figure 5:
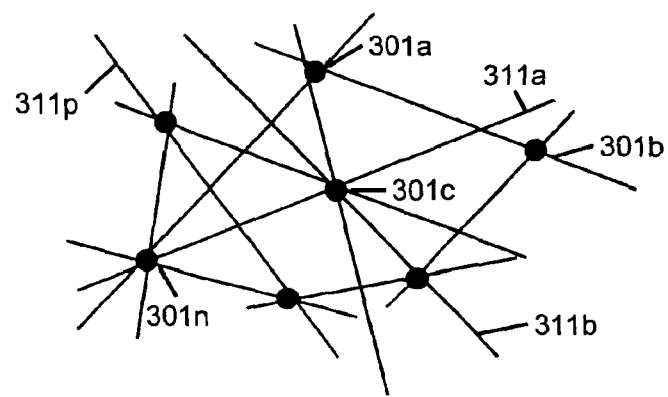
FIG. 5 illustrates how the method of the present invention may be used to monitor a 3-D volume of a reservoir.

The present invention has been discussed above using the example of two wells. In reality, receivers may be permanently installed in a plurality of wells over an area. Such a configuration is taught in U.S. Pat. No. 5,886,255 to Aronstam et al, the contents of which are fully incorporated herein be reference. With such an arrangement, the method discussed above can be used to obtain tomographic information along any line that is collinear with any two wells in the area. This is shown in FIG. 5 where a plurality of wells 301a, 301b, . . . 301n are shown. As is known, the number of possible combinations of any two of n wells is given by n (n−1)/2. Examples of these lines are denoted by 311a, 311b . . . 311p. Hence a significant portion of the reservoir can be sampled in three dimensions.

The discussion above was made primarily with reference to changes in the fluid content of a reservoir. However, it well known in the art that seismic velocities also depend upon the effective stress in the formation. The effective stress is defined as the difference between the overburden stress and the fluid pressure; hence, as fluid is produced from the reservoir, there will be accompanying changes in the seismic velocities. In addition, fluid recovery also produces other effects such as compaction and subsidence of the reservoir, the compaction being particularly noticeable in chalky reservoirs. A particularly severe example of compaction is the Ekofisk field in the North Sea where the seabed has subsided by over 3 meters: this has required expensive jacking up of the production platforms and redeployment of pipelines. The method of the present invention can thus also be used for identifying pressure changes and compaction of a reservoir, and in particular, identifying compaction before it extends all the way to the sea-bottom.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A method of determining a parameter of interest of a portion of a reservoir in earth formations comprising:

(a) deploying a first plurality of seismic receivers in a first well and a second plurality of receivers in a second well, said first well and said second well disposed on opposite sides of said portion of the reservoir;

(b) generating seismic waves at a plurality of locations at or near the surface and propagating said seismic waves in said earth formations at at least one epoch;

(c) receiving first signals indicative of said propagating seismic waves at said first and second plurality of seismic receivers at said at least one epoch;

(d) receiving second signals indicative of seismic waves reflected from a boundary below said portion of the reservoir at a third plurality of receivers at or near said surface; and (e) performing a tomographic analysis of said first and second signals for obtaining said parameter of interest at said at least one epoch.

2. The method of claim 1 wherein said plurality of locations further comprises:

(A) locations on sides of said first well and said second well opposite said portion of the reservoir, and (B) locations between said first well and said second well.

3. The method of claim 1 wherein said at least one epoch further comprises a plurality of epochs.

4. The method of claim 2 wherein said at least one epoch further comprises a plurality of epochs.

5. The method of claim 1 further comprising receiving third signals indicative of seismic waves reflected from a boundary above said portion of the reservoir at a fourth plurality of receivers at or near said surface, and wherein performing said tomographic analysis further comprises using said third signals.

6. The method of claim 1 wherein performing said tomographic analysis further comprises using said first signals for simulating a crosswell survey of said portion of the reservoir.

7. The method of claim 2 further comprising, prior to performing said tomographic analysis, correcting at least a subset of said second signals using at least a subset of said first signals.

8. The method of claim 3 further comprising performing said tomographic analysis at each of said plurality of epochs and relating differences in said tomographic analyses to at least one of (i) a change in a fluid distribution in said portion of the reservoir, (ii) a change in fluid pressure in said portion of the reservoir, and (iii) a subsidence of a bed within said portion of the reservoir.

9. The method of claim 4 further comprising performing said tomographic analysis at each of said plurality of epochs and relating differences in said tomographic analyses to at least one of (i) a change in a fluid distribution in said portion of the reservoir, (ii) a change in fluid pressure in said portion of the reservoir, and (iii) a subsidence of a bed within said portion of the reservoir.

10. The method of claim 5 wherein performing said tomographic analysis further comprises determining a traveltime difference between said second signals and said third signals.

11. The method of claim 6 wherein simulating said crosswell survey further comprises using Fermat's principle.

12. The method of claim 1 wherein performing said tomographic analysis further comprises analyzing said first, second and third signals for attenuation thereof, said attenuation being indicative of at least one of (i) a change in fluid content of said portion of the reservoir, (ii) a change in pressure of said portion of the reservoir, and, (iii) subsidence of a bed in said portion of the reservoir.

13. The method of claim 8 wherein performing said tomographic analysis further comprises analyzing said first, second and third signals for attenuation thereof, said attenuation being indicative of at least one of: (i) a change in a fluid distribution in said portion of the reservoir, (ii) a change in fluid pressure in said portion of the reservoir, and (iii) a subsidence of a bed within said portion of the reservoir.

14. The method of claim 9 wherein performing said tomographic analysis further comprises analyzing said first, second and third signals for attenuation thereof, said attenuation being indicative of a change in fluid content of said portion of the reservoir.

15. The method of claim 1 further comprising deploying seismic receivers at at least one additional well and obtaining said parameter of interest over a 3-D volume.

* * * * *